Figure 1:
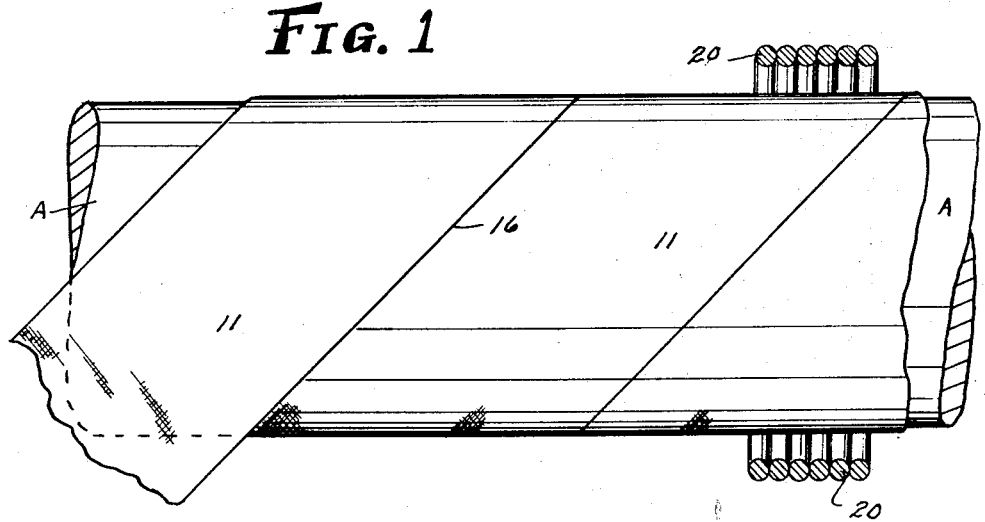

May 23, 1950 R. E. ROBERTS 2,508,774
FLEXIBLE TUBE

Filed June 15, 1945 2 Sheets-Sheet 2

INVENTOR.
ROBERT ELDON ROBERTS
BY
Bates, Teare, & McBean
ATTORNEYS

Patented May 23, 1950

2,508,774

UNITED STATES PATENT OFFICE 2,508,774

FLEXIBLE TUBE

Robert Eldon Roberts, Ridgefield, Conn.

Application June 15, 1945, Serial No. 599,645

10 Claims. (Cl. 138—56)

The object of this invention is to provide a tube having a continuous uninterrupted interior and a corrugated wall, whereby the tube may be readily flexed in any direction but in any position will form an uninterrupted conduit. Such a tube is very useful for example where fluid carrying solid particles pass through the conduit as, for example, in the dust tube in a vacuum cleaner. My tube allows the ready passage of such material without any clogging of the tube.

A preferred form of my invention is illustrated in the drawings hereof, which also illustrate the steps in the method of making the same, and the characteristics of the invention will be more fully described in connection with such drawings.

Figure 2:
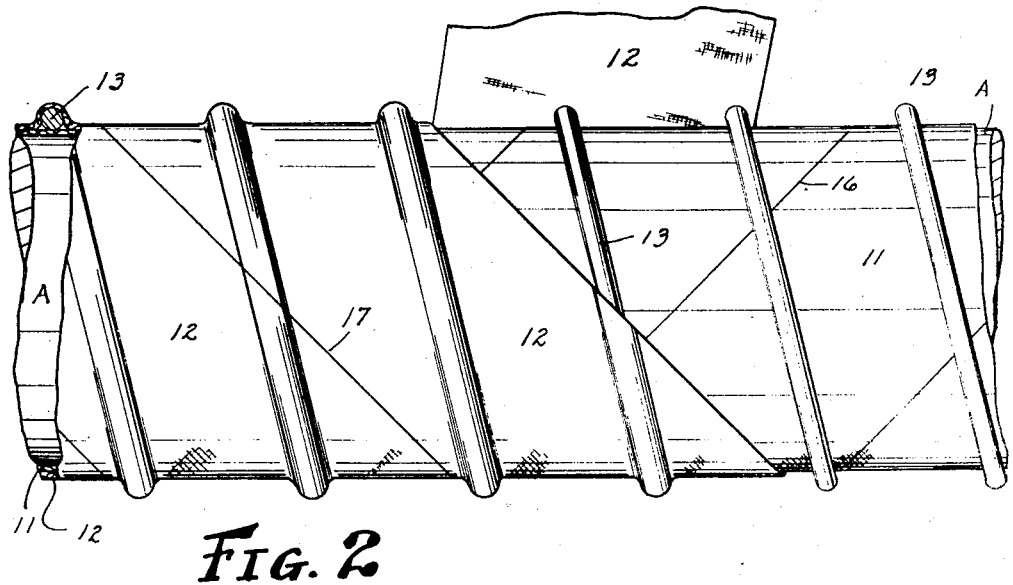
Figure 3:
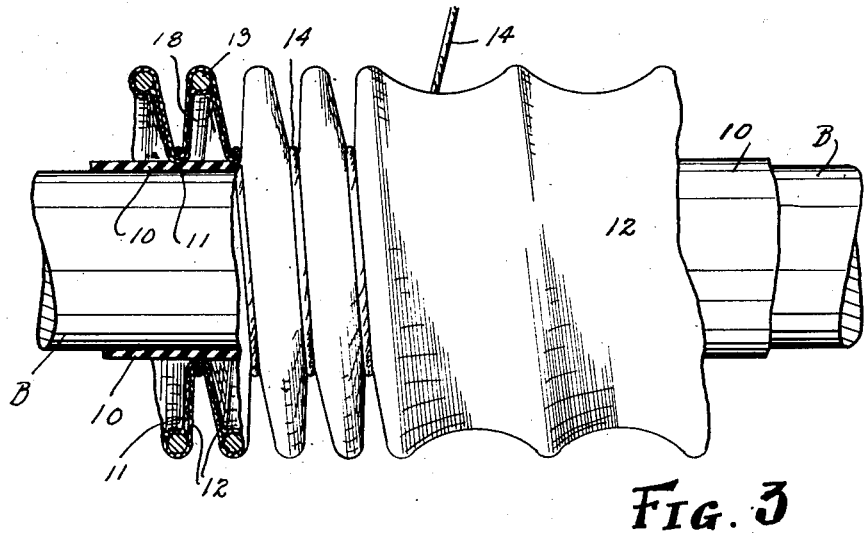
Figure 4:
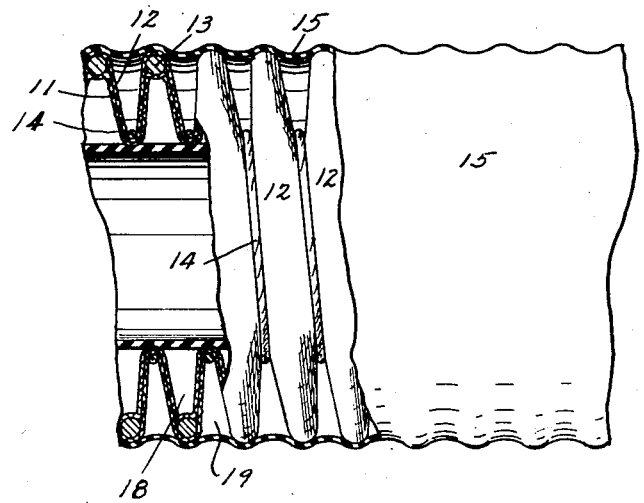

In the drawings, Fig. 1 is a sectional side elevation of the inner member of the tube carcass on a mandrel and surrounded by a helical spring compressed to an abnormal condition; Fig. 2 is a similar view showing the spring in normal condition surrounding such inner member and with the outer member of the carcass being wrapped about it; Fig. 3 is a side elevation of the carcass, corrugated upon a cylindrical tube mounted upon a mandrel; Fig. 4 is a sectional side elevation of a portion of the completed tube.

The flexible tube of this invention, as illustrated in Fig. 4, comprises a cylindrical inner tube 10 of rubber or similar impervious flexible material; a corrugated carcass of two layers 11 and 12 surrounding the inner tube 10; a helical spring 13 preferably of metal embedded between the two members of the carcass at the outer crests of the corrugations; a binding member 14 in the form of a cord or small wire binding the inner corrugation of the carcass against the inner tube, and an outer tube 15 preferably of rubber or similar impervious material surrounding the structure so far described and attached to the outer layer of the carcass at the outer crests of the corrugations.

In manufacturing such a tube as described, I prefer to proceed as follows:

I wind a strip of rubberized fabric in a spiral direction on a mandrel. Such mandrel is illustrated, for instance, at A in Fig. 1. The strip shown at 11 is preferably wound in a spiral direction about the mandrel with the edges contacting, as indicated at 16. When this strip is in place its exterior is covered with cement, a normally open helical spring indicated at 13 is placed about the seated strip. This spring is preferably of metal but may be of any suitable resilient material. In its abnormal or closed position, as shown at Fig. 1, the interior diameter of the helix is materially larger than that of the seated layer of fabric and hence may be readily passed over the fabric, but when released into its normal open condition, as shown in Fig. 2, it engages a surface of the cemented inner layer 11.

I now wind about the positioned spring a second strip of rubberized fabric 12 with its edges contacting, as shown at 17 in Fig. 2, the strip being thus cemented to the spring and to the inner layer between the spaced coils of the spring. These wide strips of fabric wrapped spirally are really on the bias in the direction I desire to make corrugations. As the end of the strip is cut on the bias the outer strip is just the length to go over the spring. I thus form what I call the carcass for the complete tube. This carcass is given a preliminary vulcanization to set the cement.

I now take an inner tube of partially vulcanized rubber or similar material, which is to form the innermost member of the completed construction, and place it upon a suitable mandrel. This inner tube is shown at 10 in Fig. 3, mounted on a mandrel B. I now place the carcass over the seated inner tube and corrugate the carcass between the coils of the spring by winding a small cord or soft wire 14 about the carcass between the coils of the spring 13 under sufficient tension to pull the carcass down snugly onto the exterior of the seated inner tube, cement being applied to the exterior of the tube in the regions where the carcass engages it. This member 14 is left in place in the finished construction.

Following the corrugating of the carcass upon the inner tube, as shown in Fig. 3, I apply cement to the exterior crests of the corrugations and place over it the external tube 15, which is preferably of rubber. This external tube may be preliminarily expanded so as to be free from the corrugated carcass as it is placed over the same and then allowed to seat on the cemented crests of the carcass. I then vulcanize the entire product, producing the flexible tube with a smooth interior and a corrugated wall, as shown in Fig. 4. There may be slight corrugations in the exterior tube, as shown in Fig. 4, but this is of no substantial disadvantage. There being no longitudinal reaction to the winding cord or wire 14, the inner tube remains perfectly smooth in its original form, as shown in Fig. 4.

Fig. 4 shows only a portion of the completed tube and is intended to illustrate any length of tube. Ordinarily, in using such a tube, after the length has been chosen for the use required, suitable rubber bushings are placed within the endmost portions of the inner tube and cemented in place, as will be well understood.

It should be noted that the cementing of the corrugated carcass to the inner tube leaves a closed helical cell 18 between the carcass and tube in which air under atmospheric pressure is trapped. Likewise the cementing of the outer sheath to the crests of the carcass leaves an annular air cell 19 with entrapped atmospheric air. These air cells are of value in providing a pneumatic cushion which assists the spring against the collapse of the tube. When vacuum is applied to the interior of the tube the tendency is to shorten the tube as well as to collapse it laterally, but this collapse and shortening is resisted by both the spring and the air cells, with the result that the tube while flexible in any direction maintains its full unobstructed interior in use.

My tube has the advantage of great flexibility, being adapted to be readily flexed in any direction without danger of kinking the tube or reducing the area of the passageway through it. Moreover, the inner tube remains smooth and uninterrupted notwithstanding such flexing and thus does not introduce obstructions to the passage of material through the tube. This characteristic is especially valuable where the tube is used for the transmission of a fluid with entrained particles which would clog a tube with inwardly exposed corrugations. At the same time, I obtain the flexibility resulting from the corrugations. Thus, when used in a vacuum cleaner for example, there are no projections on the interior upon which the dust might lodge. Furthermore, the exterior does not present any abrupt edges which might inadvertently catch on furniture or other objects in use of a vacuum cleaner.

I claim:

1. A flexible tube comprising a corrugated carcass of non-metallic material, an impervious inner lining tube secured to the inner crests of the corrugations, and an outer sheath secured to the outer crests of the corrugations and suspended across air gaps between them.

2. A flexible tube comprising an inner tube, a carcass surrounding the same and comprising two layers of material with a helical spring between them some distance from the exterior of the inner tube, and a binding member embracing the outer layer of the carcass in the region between the coils of the spring and under tension to hold the carcass against the inner tube.

3. A flexible tube comprising an inner cylindrical tube of rubber or similar material, a corrugated carcass surrounding the inner tube and retained against it by a binding member embracing the carcass at the innermost regions of its corrugations, a reinforce for the outer crests of the corrugations comprising a helical spring embedded in the carcass, and an outer sheath engaging and secured to the outer crests of the carcass.

4. A lined corrugated tube comprising a carcass having inner and outer flexible walls with a helical spring between them, said walls contacting with each other between the coils of the spring and being corrugated inwardly, an inner lining tube secured to the crests of the inner corrugation of the carcass and bridging across the space between adjacent bends, and an outer tube secured over the exterior of the outer corrugations.

5. A corrugated flexible tube having a carcass comprising an inner layer of fabric, an outer layer of fabric and a helical spring with its coils between the two layers, the two layers of the carcass being bent inwardly in a helical course between the turns of the spring, an impervious tubular lining secured to the inner corrugations of the spring, a helical binding member within the corrugations binding the same against the lining, and an exterior tubular sheath secured to the outer corrugations.

6. A flexible tube comprising a corrugated carcass of non-metallic material, a helical spring within the outer crests of the corrugations, an impervious inner tube secured in an air tight manner to the inner crests of the corrugations, and an outer impervious sheath secured in an air tight manner to the outer crests of the corrugations and bridging across the air gaps between them.

7. A flexible tube comprising a cylindrical inner tube of rubber or similar impervious flexible material, a corrugated carcass of two layers surrounding and attached to the inner tube, a helical spring preferably of metal embedded between the two members of the carcass at the outer crests of the corrugations, a binding member in the form of a cord or small wire binding the inner corrugation of the carcass against the inner tube, and an outer tube preferably of rubber or similar impervious material surrounding the structure so far described and attached to the outer layer of the carcass at the outer crests of the corrugations.

8. A flexible tube comprising a corrugated carcass having a helical spring within the outer crests of the corrugations, an outer sheath secured to the outer crests of the corrugations and suspended across air gaps between them, and an inner tube engaging the inner crests of the corrugations.

9. A flexible tube comprising a corrugated carcass having longitudinally spaced outer and inner crests, a helical spring within the outer crests of the corrugations, an inner tube secured to the inner crests of the corrugations, a flexible binding member lying in helical form within the corrugations and binding the same against the inner tube and a continuous impervious sheath secured to the outer corrugations and bridging across the space between them.

10. A flexible tube comprising a corrugated carcass of rubberized fabric having longitudinally spaced outer and inner crests, an impervious lining tube secured in an air-tight manner to the inner crests of the corrugations and bridging across the space between them and an impervious outer sheath secured in an air-tight manner to the outer crests of the corrugations and bridging across the space between them.

ROBERT ELDON ROBERTS.

REFERENCES CITED

The following references are of record in the file of this patent:

UNITED STATES PATENTS

| Number | Name | Date |
|---|---|---|
| 1,746,701 | Kimmich | Feb. 11, 1930 |
| 1,993,984 | Wulle et al. | Mar. 12, 1935 |
| 2,085,563 | Aime | June 29, 1937 |
| 2,186,440 | Williams | Jan. 9, 1940 |
| 2,321,064 | Broedling | June 8, 1943 |
| 2,330,651 | Welger | Sept. 28, 1943 |

FOREIGN PATENTS

| Number | Country | Date |
|---|---|---|
| 538,171 | Great Britain | Nov. 4, 1940 |